United States Patent [19]

Gjertsen et al.

[11] Patent Number: 4,684,500
[45] Date of Patent: Aug. 4, 1987

[54] GUIDE THIMBLE CAPTURED LOCKING TUBE IN A RECONSTITUTABLE FUEL ASSEMBLY

[75] Inventors: Robert K. Gjertsen, Monroeville; John M. Shallenberger, Fox Chapel; John F. Wilson, Murrysville, all of Pa.

[73] Assignee: Westinghouse Electric Corp., Pittsburgh, Pa.

[21] Appl. No.: 775,208

[22] Filed: Sep. 12, 1985

[51] Int. Cl.⁴ .................................................. G21C 3/32
[52] U.S. Cl. ..................................... 376/446; 376/353; 376/449
[58] Field of Search ..................... 376/446, 449, 353

[56] References Cited

U.S. PATENT DOCUMENTS 4,617,171 10/1986 Feutrel ............................... 376/446

FOREIGN PATENT DOCUMENTS 2529704 1/1984 France .

Primary Examiner—Donald P. Walsh

[57] ABSTRACT

In a reconstitutable fuel assembly, a top nozzle attaching structure for mounting the top nozzle adapter plate in releasable locking engagement upon the guide thimble upper end portions includes several improved features. First, a locking tube is mounted within the guide thimble upper end portion for movement between an upper locking position wherein the adapter plate and guide thimble upper end portion are maintained in the locking engagement and a lower unlocking position wherein the adapter plate is releasable from the guide thimble upper end portion. Also, a plurality of protrusions are attached on the locking tube so as to extend outwardly thereof and through axial slots defined in the guide thimble upper end portion. The protrusions are yieldable for engaging and releasing from a groove in the passageway of the adapter plate. The purpose of the adapter plate passageway groove is to receive a bulge on the guide thimble upper end portion when the guide thimble is engaged with the adapter plate. When the protrusion is engaged in the groove, the locking tube will be retained at its upper locking position. On the other hand, when the protrusion is released from the groove, the locking tube can move to its lower unlocking position. Finally, an opening is defined in the guide thimble upper end portion aligned and connected with each one of the slots through which one of the protrusions extends for receiving the protrusion when the locking tube is moved to its lower unlocking position. The opening provides sufficient clearance with respect to the protrusion extending through it to permit inward elastic collapse of the guide thimble upper end portion for withdrawing the bulge from the passageway groove and thereby releasing the adapter plate from the guide thimble upper end portion. Each of protrusions is in the form of a spring attached in cantilevered fashion to the locking tube and axially extending along the tube generally parallel with one of the slots in the guide thimble upper end portion. Also, each of the springs includes an outwardly protruding portion which extends through the one slot.

13 Claims, 14 Drawing Figures

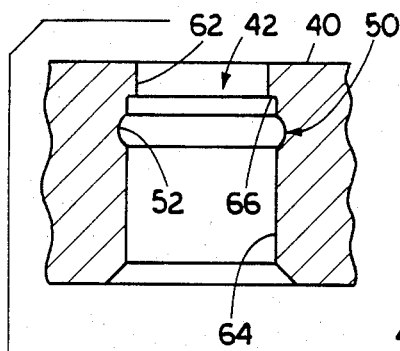
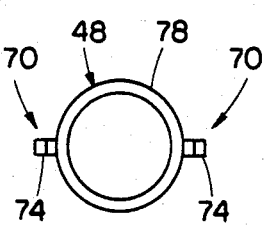
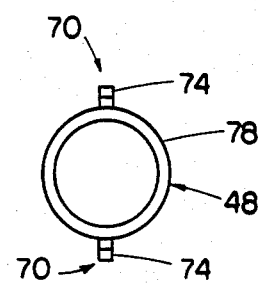
FIG. 3    FIG. 5
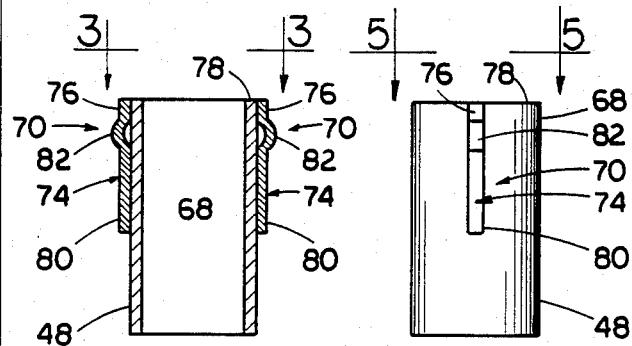
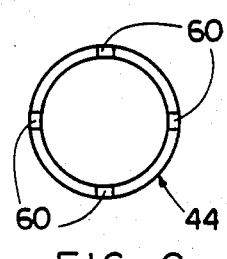
FIG. 4    FIG. 6
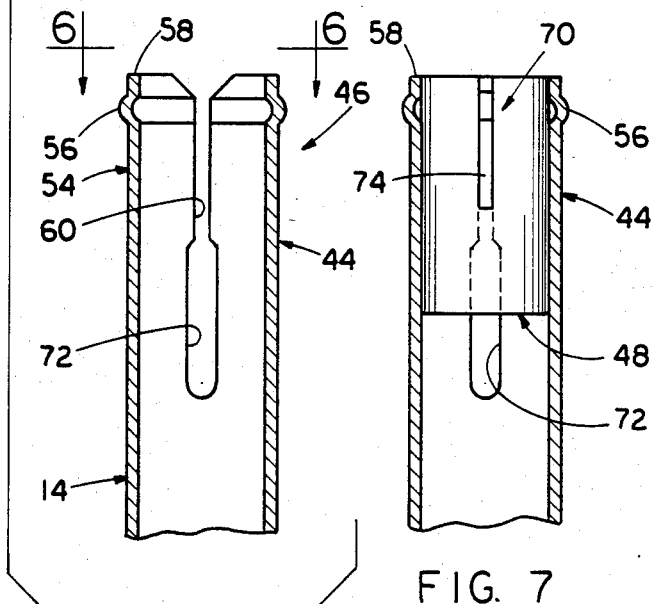
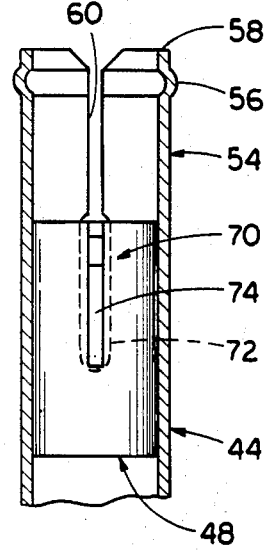
FIG. 2    FIG. 7    FIG. 8

GUIDE THIMBLE CAPTURED LOCKING TUBE IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With A Removable Top Nozzle" by John M. Shallenberger et al, assigned U.S. Ser. No. 644,758 and filed Aug. 27, 1984.

2. "Locking Tube Removal And Replacement Tool And Method In A Reconstitutable Fuel Assembly" by John M. Shallenberger et al, assigned U.S. Ser. No. 670,418 and filed Nov. 9, 1984.

3. "Top Nozzle Removal And Replacement Fixture And Method In A Reconstitutable Fuel Assembly" by John M. Shallenberger et al, assigned U.S. Ser. No. 670,729 and filed Nov. 13, 1984.

4. "Locking Tube Insertion Fixture And Method In A Reconstitutable Fuel Assembly" by John M. Shallenberger et al, assigned U.S. Ser. No. 689,696 and filed Jan. 8, 1985.

5. "Locking Tube Removal Fixture And Method In A Reconstitutable Fuel Assembly" by John M. Shallenberger et al, assigned U.S. Ser. No. 698,232 and filed Jan. 28, 1985.

6. "Reusable Locking Tube In A Reconstitutable Fuel Assembly" by John M. Shallenberger et al, assigned U.S. Ser. No. 719,108 and filed Apr. 2, 1985.

7. "Guide Thimble Captured Locking Tube In A Reconstitutable Fuel Assembly" by Gary E. Paul, assigned U.S. Ser. No. 717,991 and filed Mar. 29, 1985.

BACKGROUND OF THE INVENTION

1. Field of the Invention

The present invention relates generally to fuel assemblies for nuclear reactors and, more particularly, is concerned with improvements for releasably locking the top nozzle on the upper ends of the control rod guide thimbles of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array by grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn from the outer socket. In such manner, the locking tubes maintain the inner sockets in locking engagement with the outer sockets and thereby the attachment of the top nozzle on the upper ends of the guide thimbles.

Furthermore, to prevent inadvertent escape due to vibration forces and the like, heretofore the locking tubes have been secured in their locking positions. After insertion of the locking tubes into their locking positions within the inner sockets of the hollow upper end portions of the guide thimbles, a pair of bulges are formed in the upper portion of each locking tube. These bulges fit into the circumferential bulge in the upper end portion of the guide thimble and provide an interference fit therewith.

When reconstitution of the fuel assembly is undertaken, these locking tubes must first be removed from the top nozzle. The locking tubes must be handled as "loose parts", either individually or together using an appropriate removal fixture, which require storage, retention and accountability during performance of underwater nuclear fuel assembly reconstitution activities. Then, after the failed fuel rods have been removed and replaced and following remounting of the top nozzle, handling is again required when either the same locking tubes are reused a second time by inserting them back into the guide thimble upper ends and re-deforming them to secure them at their locking positions or a full complement of new locking tubes are inserted on the guide thimble upper ends and secured by bulging.

This practice has a number of disadvantages. First, a large number of locking tubes must be handled and a large inventory thereof must be maintained. Second, provision must be made for disposal of the discarded irradiated locking tubes. Third, after each locking tube is inserted, a deforming operation must be carried out remotely to produce the bulges in each tube. And, fourth, an inspection of bulges must be carried out remotely to ascertain whether the bulges were made to the correct dimension. Consequently, notwithstanding the overall acceptability of the use of the above-described attaching structure in reconstitutabale fuel assemblies, these recently recognized disadvantages have created a need for further improvement of the reconstitution operation so as to enhance commercial acceptance thereof.

SUMMARY OF THE INVENTION

The present invention provides a reconstitutable fuel assembly with improved features for locking the top nozzle upon and unlocking it from the guide thimbles which are designed to satisfy the aforementioned needs. The present invention provides an alternative to the locking tube design illustrated and described in the last patent application cross-referenced above.

In the last cross-referenced application, a push-down locking tube concept was introduced in which the locking tube is not removed from the fuel assembly guide thimbles during underwater reconstitution activities. This concept improves the reconstitution operation in that it eliminates need to handle locking tubes as "loose parts", reduces time required to reconstitute by eliminating need to deform locking tubes after remounting, and eliminates need for large locking tube inventory and disposal facilities.

The present invention retains the improvements fostered by the push-down locking tube concept while removing certain potential shortcomings of the particular locking tube design of the last referenced application which implemented this concept. The referenced locking tube design uses a split or slotted locking tube construction to provide resilient means to anchor the tube to the guide thimble in each of its locking and unlocking positions therein and, at the same time, allow the locking tube to be moved between those positions. However, because of the elasticity of the slotted tube, there is no postive means assuring that the locking tube will stay in the locked position. Thus, the slotted locking tube does not provide a sufficient margin of strength to ensure that the guide thimble upper end portions will always be maintained in their locking engagement with the adapter plate grooves.

In contrast to the slotted locking tube, the present invention provides a locking tube having a continuous (not split) wall similar to the earlier locking tube in the first cross-referenced application and thus has the same high margin of strength of the earlier continuous locking tube. However, unlike the earlier locking tube, the improved tube of the present invention remains in the guide thimble during reconstitution and, unlike the previous slotted locking tube, the improved tube incorporates means which positively retains the locking tube in the guide thimble so that there is no possibility that it can become a "loose part" during reactor operation.

Accordingly, the present invention sets forth improvements in a reconstitutable fuel assembly including a top nozzle with an adapter plate having at least one passageway, at least one guide thimble with an upper end portion, and an attaching structure for mounting the top nozzle adapter plate in releasable locking engagement upon the guide thimble upper end portion. The attaching structure includes a groove defined in the adapter plate passageway, a bulge defined in the guide thimble upper end portion and at least one slot axially defined in the guide thimble upper end portion so as to allow inward elastic collapse of the upper end portion to permit insertion and withdrawal of the bulge into and from a locking relation with the groove in the adapter plate passageway. The improvement comprises: (a) a locking tube mounted within the guide thimble upper end portion for movement relative thereto between an upper locking position wherein the adapter plate and guide thimble upper end portion are maintained in the locking engagement and a lower unlocking position wherein the adapter plate is releasable from the guide thimble upper end portion; and (b) at least one protrusion attached on the locking tube so as to extend outwardly thereof and through the slot in the guide thimble upper end portion, the protrusion being yieldable for engaging the passageway groove of the adapter plate to retain the locking tube at its upper locking position and for releasing from the passageway groove to allow movement of the locking tube to its lower unlocking position.

More particularly, the protrusion is in the form of a spring which is attached to the locking tube. The spring is attached at one end in a cantilevered fashion to the tube and is free at an opposite end. Also, the spring extends axially along the locking tube and generally parallel with the slot in the guide thimble upper end portion and includes an outwardly protruding portion which extends through the slot.

Further, the improvement comprises means defining a laterally enlarged opening in the guide thimble upper end portion being connected with the slot for receiving the protrusion when the locking tube is moved to its lower unlocking position. The enlarged opening provides sufficient clearance relative to the protrusion extending therethrough to permit inward elastic collapse of the guide thimble upper end portion for withdrawing the bulge from the passageway groove and releasing the adapter plate from the guide thimble upper end portion.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is a sectioned, exploded view of the components of the attaching structure associated with the top nozzle and the guide thimbles of the reconstitutable fuel assembly and including the improved features of the present invention.

FIG. 3 is a top plan view, as seen along line 3—3 of FIG. 2, looking down on the top of the locking tube which constitutes one of the improved features of the present invention.

FIG. 4 is an elevational view of the locking tube after being rotated ninety degrees from its position seen in FIG. 2.

FIG. 5 is another top plan view of the locking tube, as seen along line 5—5 of FIG. 4, after being rotated ninety degrees from its position shown in FIG. 3.

FIG. 6 is a top plan view, as seen along line 6—6 of FIG. 2, looking down on the top of the upper end portion of the guide thimble.

FIG. 7 is an elevational view of the locking tube similar to that of FIG. 4, but illustrating the locking tube disposed in a locking position in the upper end portion of the guide thimble and with the guide thimble removed from the top nozzle adapter plate passageway.

FIG. 8 is an elevational view similar to that of FIG. 7, but showing the locking tube disposed in an unlocking position in the upper end portion of the guide thimble.

DETAILED DESCRIPTION OF THE INVENTION

Figure 1:
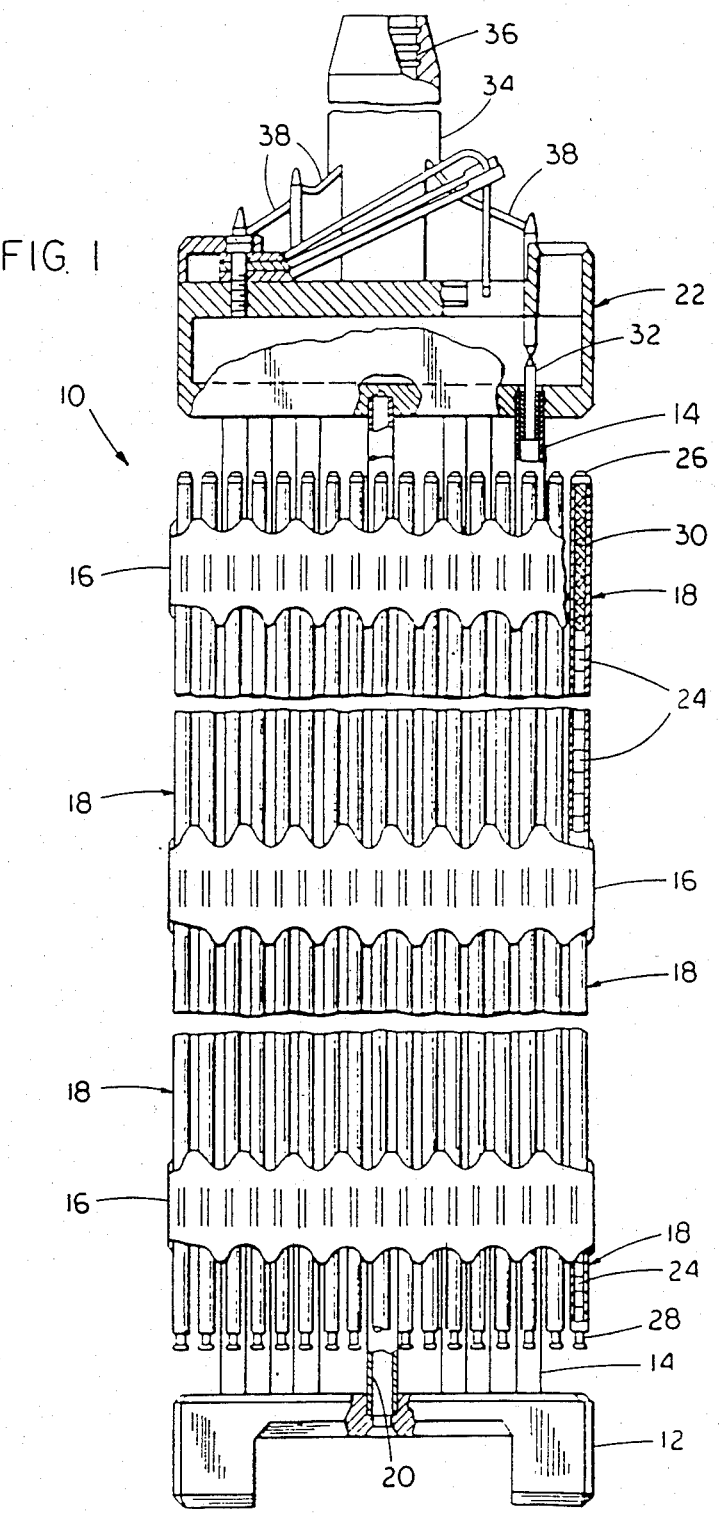
FIG. 1 is a side elevational view, with parts partially sectioned and broken away for purposes of clarity, of a reconstitutable fuel assembly employing the improved features of the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a reconstitutable nuclear fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14, in a manner fully described below, to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor core. A liquid moderator/coolant such as water, or water containing boron, is pumped upwardly through the fuel assemblies of the core in order to extract heat generated therein for the production of useful work.

To control the fission process, a number of control rods 32 are reciprocally movable in the guide thimbles 14 located at predetermined positions in the fuel assembly 10. Specifically, a rod cluster control mechanism 34 is associated with the top nozzle 22 and has an internally threaded cylindrical member 36 with a plurality of radially extending flukes or arms 38. Each arm 38 is interconnected to one or more control rods 32 such that the control mechanism 34 is operable to move the control rods 32 vertically in the guide thimbles 14 to thereby control the fission process in the fuel assembly 10, all in a well-known manner.

Figure 9:
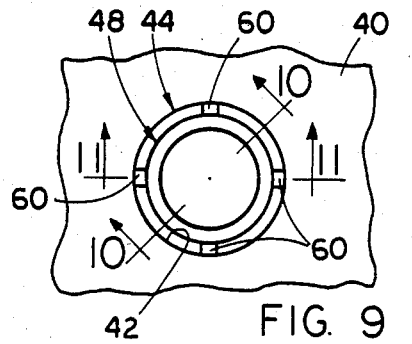
FIG. 9 is a fragmentary top plan view of the top nozzle adapter plate illustrating one of the adapter plate passageways with the guide thimble upper end portion disposed therein in its expanded position and the locking tube disposed in the guide thimble in its locking position.
Figure 12:
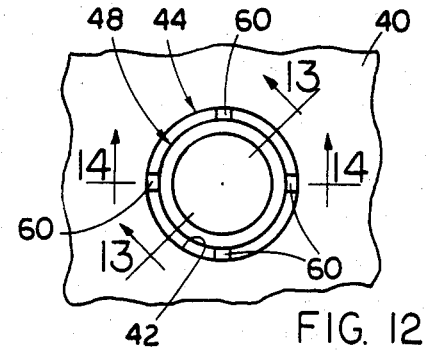
FIG. 12 is another fragmentary top plan view of the top nozzle adapter plate similar to that of FIG. 9, but illustrating the locking tube disposed in the guide thimble in its unlocking position.

As illustrated in FIG. 2, the top nozzle 22 has a lower adapter plate 40 with a plurality of control rod passageways 42 (only one being shown) formed through the adapter plate. The control rod guide thimbles 14 (only one being shown) have their uppermost end portions 44 coaxially positioned within control rod passageways 42 in the adapter plate 40. For gaining access to the fuel rods 18, the adapter plate 40 of the top nozzle 22 is removably connected to the upper end portions 44 of the guide thimbles 14 by an attaching structure, generally designated 46. The attaching structure 46, best seen in FIGS. 2, 13 and 14, includes the improved features of the present invention. Except for certain important improved features associated with each locking tube 48 and each guide thimble upper end portion 44 which allows the locking tube to be captured in the guide thimble 14 and renders it reusable as will be discussed later, the attaching structure 46 contains features generally similar to those depicted in FIGS. 9 and 14 of the first patent application cross-referenced above. The prior features of the attaching structure 46 will be described herein to the extent necessary to facilitate an understanding of the improved features of the present invention.

TOP NOZZLE ATTACHING STRUCTURE

Figure 13:
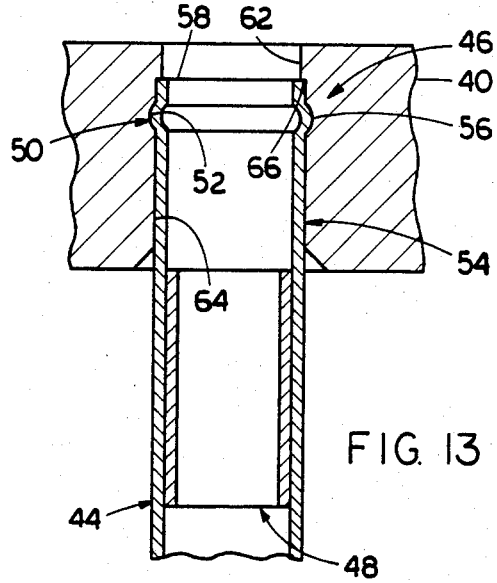
FIG. 13 is a sectional view taken along line 13—13 of FIG. 12 similar to that of FIG. 10, but showing the locking tube in its unlocking position within the guide thimble.
Figure 14:
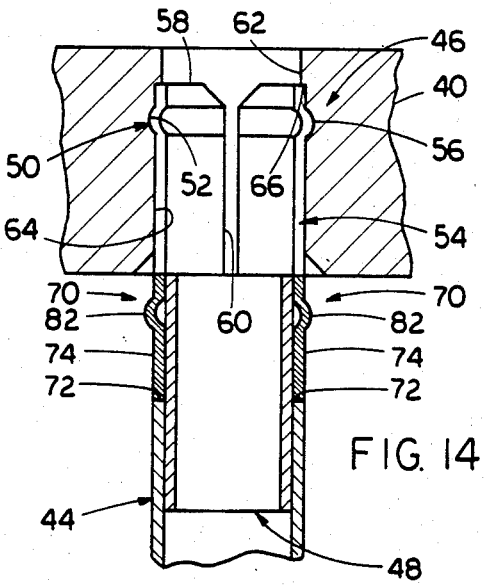
FIG. 14 is another sectional view similar to that of FIG. 13, but taken along line 14—14 of FIG. 12 which is rotated approximately forty five degrees from line 13—13.

As best seen in FIGS. 2, 13 and 14, the top nozzle attaching structure 46 of the reconstitutable fuel assembly 10 includes a plurality of outer sockets 50 (only one being shown) defined in the top nozzle adapter plate 40 by the plurality of passageways 42 (also only one being shown) which each contains an annular circumferential groove 52 (only one being shown), a plurality of inner sockets 54 (only one being shown) defined on the upper end portions 44 of the guide thimbles 14, and a plurality of improved locking tubes 48 (only one being shown) inserted in the inner sockets 54 to maintain them in locking engagement with the outer sockets 50.

Each inner socket 46 is defined by an annular circumferential bulge 56 on the hollow upper end portion 44 of one guide thimble 14 only a short distance below its upper edge 58. A plurality of elongated axial slots 60 are formed in the upper end portion 44 of each guide thimble 14 to permit inward elastic collapse of the slotted end portion to a compressed position so as to allow the annular bulge 56 thereon to be inserted within and removed from the annular groove 52 via the adapter plate passageway 42. The annular bulge 56 seats in the annular groove 52 when the guide thimble upper end portion 44 is inserted in the adapter plate passageway 42 and has assumed an expanded position. In such manner, the inner socket 54 of each guide thimble 14 is inserted into and withdrawn from locking engagement with one of the outer sockets 50 of the adapter plate 40.

Figure 10:
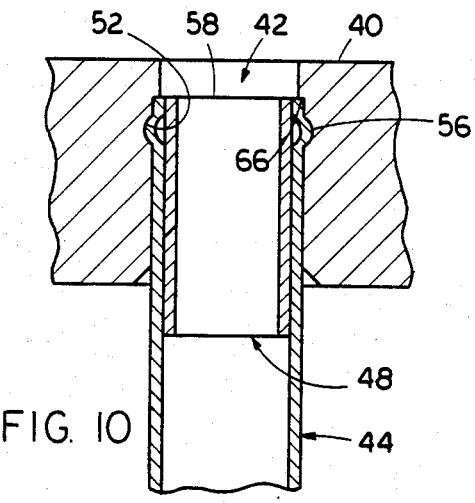
FIG. 10 is a sectional view taken along line 10—10 of FIG. 9, showing the guide thimble upper end portion in its expanded position in the adapter plate passageway and the locking tube in its locking position within the guide thimble.

More particularly, the axially extending passageway 42 in the adapter plate 40 which defines the outer socket 50 is composed of an upper bore 62 and a lower bore 64. The lower bore 64 is of considerably greater axial length than the upper bore 62 and contains the annular groove 52 which is spaced a short distance below a ledge 66 formed at the intersection of the upper and lower bores 62,64. The lower bore 64 has a diameter which is greater than that of the upper bore 62; therefore, the ledge 66 faces in a downward direction. The primary purpose of the ledge 66 is to serve as a stop or an alignment guide for proper axial positioning of the upper end portion 44 in the passageway 42 when the inner socket 54 is inserted into the outer socket 50. As seen in FIGS. 10, 13 and 14, the upper edge 58 abuts the ledge 66.

IMPROVED TOP NOZZLE LOCKING AND UNLOCKING FEATURES

Referring now to FIGS. 2 to 14, there is also seen the improved features of the present invention being associated with the locking tube 48 and the guide thimble upper end portion 44.

Figure 11:
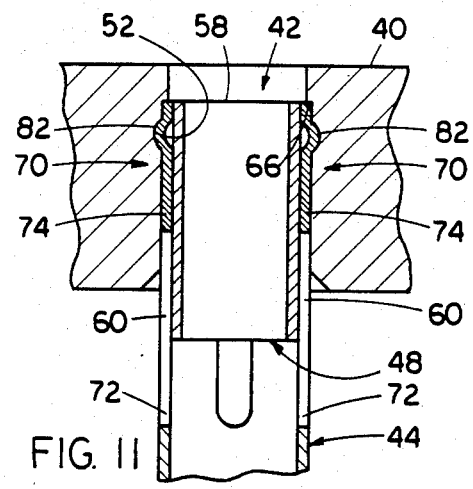
FIG. 11 is another sectional view similar to that of FIG. 10, but taken along 11—11 of FIG. 9 which is rotated approximately forty five degrees from line 10—10.

First, the locking tube 48 has an improved continuous cylindrical wall configuration and is mounted within the guide thimble upper end portion 44 for movement therealong between an upper locking position, as seen in FIGS. 10 and 11, and a lower unlocking position, as seen in FIGS. 13 and 14. When the locking tube 48 is at its upper locking position, its upper portion 68 is located coextensive with the inner and outer sockets 54,50 for retaining the inner socket 54 seated within the outer socket 50 and thereby maintaining the adapter plate 40 and the guide thimble upper end portion 44 in locking engagement. On the other hand, when the locking tube 48 is at its lower unlocking position, its upper portion 68 is located below the inner and outer sockets 54,50 for allowing unseating of the inner socket 54 from the outer socket 50 and thereby release of the adapter plate 40 from the guide thimble upper end portion 44.

Other improved features of the present invention relate to a plurality of protrusions 70 attached on the exterior of the locking tube 48 and a plurality of enlarged openings 72 defined in the guide thimble upper end portion 44 at the lower ends of the axial slots 60 defined therein. Preferably, two protrusions 70 are circumferentially displaced 180 degrees apart on the locking tube upper portion 68 and extend outwardly thereof through two of the four axial slots 60 in the guide thimble upper end portion 44. It will be recalled that the four axial slots 60, which are circumferentially displaced 90 degrees apart, extend from a location on the guide thimble upper end portion 44 below the annular bulge 56 therein, upwardly through the bulge and to the upper edge 58 of the guide thimble upper end portion located above the bulge so as to allow inward elastic collapse of the upper end portion 44 to permit insertion and withdrawal of the larger annular bulge 56 into and from a locking relation with the smaller annular groove 52 in the adapter plate passageway 42.

Each of the protrusions 70, preferably, takes the form of a resiliently yieldable leaf spring 74 being attached at one end 76, such as by being welded at its upper end, to an upper edge 78 of the locking tube 48. The spring 74 extends axially downwardly in cantilevered fashion along the upper portion 68 of the locking tube 48 and generally parallel with one of the slots 60 in the guide thimble upper end portion 44. The spring 74 is free at an opposite, lower end 80 and includes an outwardly protruding portion 82 at its midsection which extends through and beyond the slot 60.

In summary, each spring-like protrusion 70 extends along the locking tube upper portion 68 and outwardly through one of the slots 60 in the guide thimble upper end portion 44. Furthermore, each spring-like protrusion 70 is yieldable for placing its protruding portion 82 into engagement with the passageway groove 52 of the adapter plate 40 to retain the locking tube 48 at its upper locking position and also for releasing its protruding portion 82 from the passageway groove 52 to allow movement of the locking tube 48 to its lower unlocking position.

Finally, each of the openings 72 in the guide thimble upper end portion 44 is defined below the annular bulge 56 and aligned and connected with one of the slots 60 through which one of the spring-like protrusions 70 extends. Each opening 72 receives one of the protrusions 70 when the locking tube 48 is moved to its lower unlocking position. Also, each opening 72 is enlarged in size laterally or in a circumferential direction for providing sufficient clearance relative to the one protrusion 70 extending through it to permit inward elastic collapse of the guide thimble upper end portion 44 so that the annular bulge 56 can be either inserted into or withdrawn from its locking relation with the passageway groove 52 and the adapter plate 40 placed into or released from its locking engagement with the guide thimble upper end portion 44.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a reconstitutable fuel assembly including a top nozzle with an adapter plate having at least one passageway, at least one guide thimble with an upper end portion, and an attaching structure for mounting said top nozzle adapter plate in releasable locking engagement upon said guide thimble upper end portion, said attaching structure including a groove defined in said adapter plate passageway, a bulge defined in said guide thimble upper end portion and at least one slot axially defined in said guide thimble upper end portion so as to allow inward elastic collapse of said upper end portion to permit insertion and withdrawal of said bulge into and from a locking relation with said groove in said adapter plate passageway, the improvement which comprises:

(a) a locking tube mounted within said guide thimble upper end portion for movement relative thereto between an upper locking position wherein said adapter plate and guide thimble upper end portion are maintained in said locking engagement and a lower unlocking position wherein said adapter plate is releasable from said guide thimble upper end portion; and (b) at least one protrusion attached on said locking tube so as to extend outwardly thereof and through said slot in said guide thimble upper end portion, said protrusion being yieldable for engaging said passageway groove of said adapter plate to retain said locking tube at its upper locking position and for releasing from said passageway groove to allow movement of said locking tube to its lower unlocking position.

2. The reconstitutable fuel assembly as recited in claim 1, wherein said protrusion is in the form of a spring attached to said locking tube.

3. The reconstitutable fuel assembly as recited in claim 2, wherein said spring is attached at one end to said locking tube and free at an opposite end.

4. The reconstitutable fuel assembly as recited in claim 2, wherein said spring extends axially along said locking tube and generally parallel with said slot in said guide thimble upper end portion.

5. The reconstitutable fuel assembly as recited in claim 2, wherein said spring is attached in a cantilevered fashion to an upper end of said locking tube.

6. The reconstitutable fuel assembly as recited in claim 2, wherein said spring includes an outwardly protruding portion which extends through said slot.

7. The reconstitutable fuel assembly as recited in claim 1, further comprising means defining an opening in said guide thimble upper end portion being connected with said slot for receiving said protrusion when said locking tube is moved to its lower unlocking position and providing sufficient clearance relative to said protrusion extending therethrough to permit inward elastic collapse of said guide thimble upper end portion for withdrawing said bulge from said passageway groove and releasing said adapter plate from said guide thimble upper end portion.

8. In a reconstitutable fuel assembly including a top nozzle with an adapter plate having at least one passageway, at least one guide thimble with an upper end portion, and an attaching structure for mounting said top nozzle adapter plate in releasable locking engagement upon said guide thimble upper end portion, said attaching structure including a circumferential groove defined in said adapter plate passageway, a circumferential bulge defined in said guide thimble upper end portion having a larger diameter than said passageway groove and a plurality of slots defined in said guide thimble upper end portion which extends from a location below said bulge, upwardly through said bulge and to an upper edge of said guide thimble upper end portion located above said bulge, said slots allowing inward elastic collapse of said upper end portion to permit insertion and withdrawal of said larger bulge into and from a locking relation with said smaller groove in said adapter plate passageway, the improvement which comprises:

(a) a locking tube mounted within said guide thimble upper end portion for movement relative thereto between an upper locking position wherein said adapter plate and guide thimble upper end portion are maintained in said locking engagement and a lower unlocking position wherein said adapter plate is releasable from said guide thimble upper end portion;

(b) a plurality of protrusions attached on said locking tube so as to extend outwardly thereof and through at least some of said slots in said guide thimble upper end portion, said protrusions being yieldable for engaging said passageway groove of said adapter plate to retain said locking tube at its upper locking position and for releasing from said passageway groove to allow movement of said locking tube to its lower unlocking position; and (c) means defining a plurality of laterally enlarged openings in said guide thimble upper end portion, said each enlarged opening being defined below said bulge and aligned and connected with one of said slots through which one of said protrusions extends for receiving said protrusion when said locking tube is moved to its lower unlocking position and providing sufficient clearance relative to said protrusion extending therethrough to permit inward elastic collapse of said guide thimble upper end portion for withdrawing said bulge from said passageway groove and releasing said adapter plate from said guide thimble upper end portion.

9. The reconstitutable fuel assembly as recited in claim 8, wherein each of said protrusions is in the form of a spring attached to said locking tube.

10. The reconstitutable fuel assembly as recited in claim 9, wherein each of said springs is attached at one end to said locking tube and free at an opposite end.

11. The reconstitutable fuel assembly as recited in claim 9, wherein each of said springs extends axially along said locking tube and generally parallel with one of said slots in said guide thimble upper end portion.

12. The reconstitutable fuel assembly as recited in claim 9, wherein each of said springs is attached in a cantilevered fashion to an upper end of said locking tube.

13. The reconstitutable fuel assembly as recited in claim 9, wherein each of said springs includes an outwardly protruding portion which extends through said one slot.

* * * * *